United States Patent Office 2,995,699
Patented Aug. 8, 1961

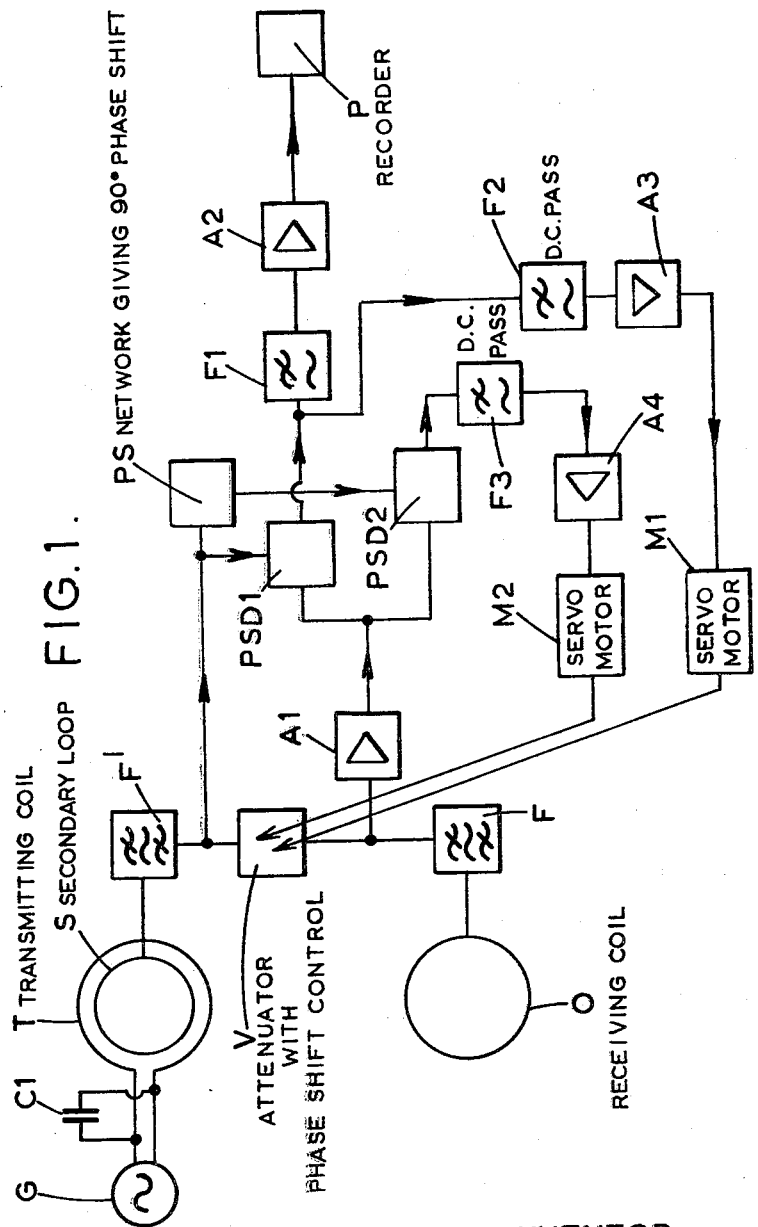

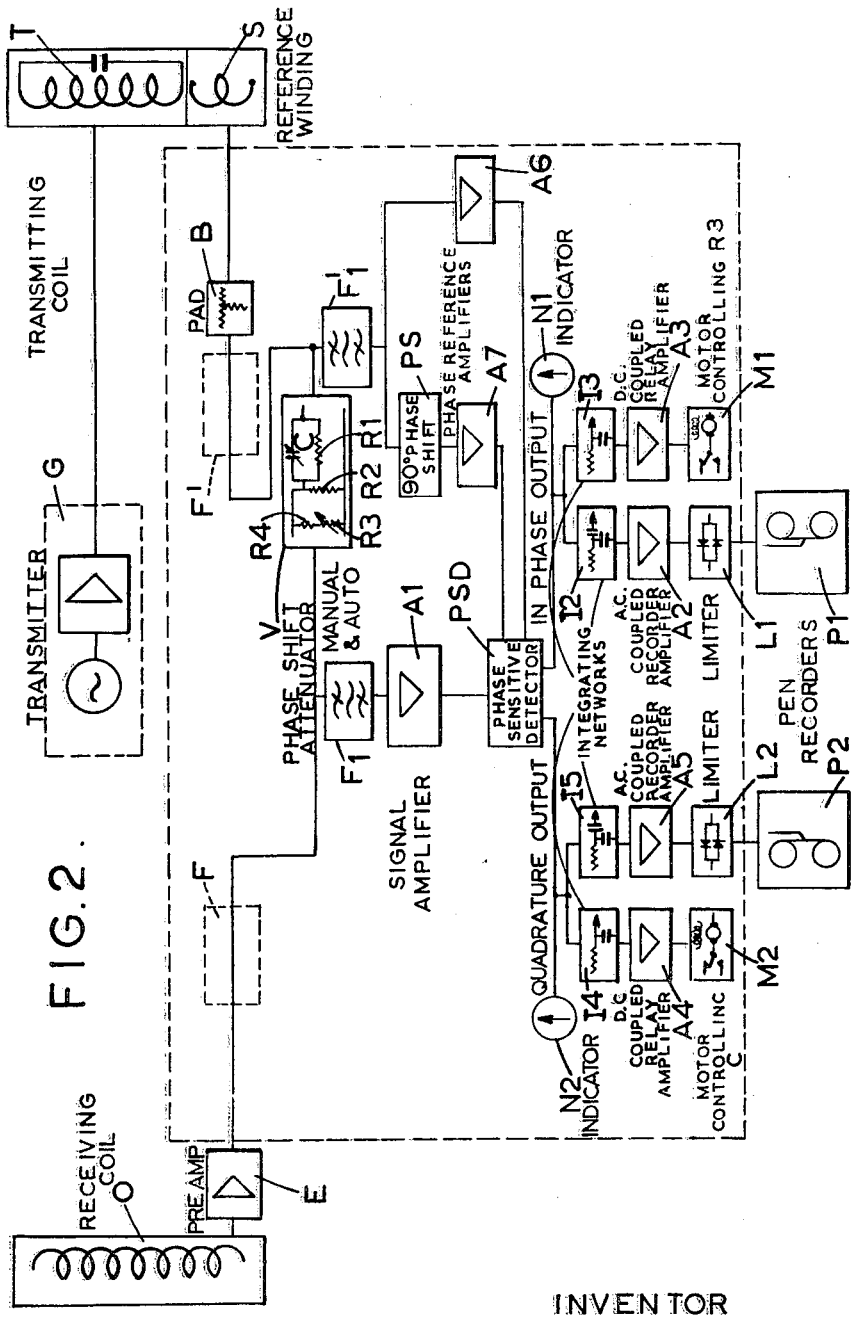

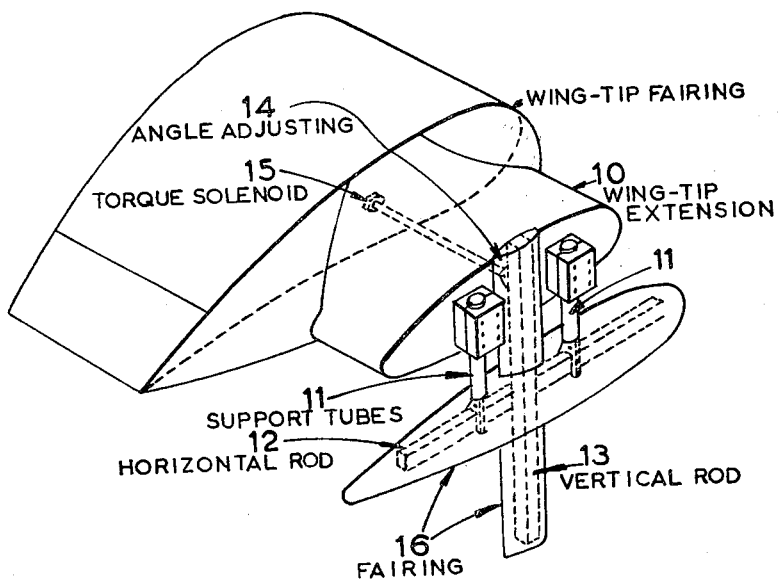

2,995,699
GEOPHYSICAL SURVEY APPARATUS
Eric Charles Snelling, Horley, and Peter Doidge Gribble, Old Coulsdon, England, asignors to The Mullard Radio Valve Company Limited, London, England
Filed Feb. 29, 1956, Ser. No. 568,621
Claims priority, application Great Britain Aug. 5, 1955
15 Claims. (Cl. 324—4)

This invention relates to geophysical survey apparatus and the like.

Eddy current methods of prospecting used by survey teams working on the ground are well known. A large transmitting coil is erected in the region to be searched and a receiving coil is placed in one of a number of carefully sited positions in the vicinity. The coils are correctly oriented and for a given alternating current in the transmitting coil the E.M.F. induced in the receiving coil is measured. In the absence of any disturbing material in the magnetic field of the transmitting coil, the primary field, $H_p$, at the receiving coil and hence the E.M.F. E induced in the receiving coil depend only on the geometry of the system of the coils and on the value of the current I in the transmitting coil. This is approximately true of two coils mounted near the ground provided the operating frequency is low enough to render the ground conductivity negligible in its effect and provided there are no deposits in the vicinity having relatively high conductivity. If such deposits exist then eddy-currents will be induced in them and these will give rise to a secondary field, $H_s$, which will distort the primary field and, in general, alter the E.M.F. in the receiving coil. Thus the presence of conducting deposits may be detected. In general the conducting deposits will change the amplitude, phase and direction of the primary field and any one or combination of these changes may be detected. Another way of regarding this is that the presence of conducting material changes the mutual, or transfer, impedance and this change is measured. The change due to spherical conducting body of radius R located at a distance $h_1$ from the transmitting coil and $h_2$ from the receiving coil when these two coils are a distance $d$ apart has been given by $$\frac{H_s}{H_p} \text{ or } \frac{\Delta E}{I} = K\frac{R^3 d^3}{h_1{}^3 h_2{}^3}(M+jN)$$

where K is a constant
and M and N are functions of $R\sqrt{\sigma\mu\omega}$, $\sigma$ being the conductivity of the sphere, $\mu$ the permeability of the air and overburden media and of the ore body (i.e. the permeability of the ore body is taken as equal to that of free space which is unity in the C.G.S. system) and $\omega$ is the angular frequency.

The disadvantage of the ground method is that it is very slow, and so attention has been turned to mobile units, using road vehicles or aircraft.

It is obvious that as soon as airborne equipment is considered the values $h_1$ and $h_2$ increase and become approximately equal to the height, $h$, of the aircraft above the centre of the ore body. Thus $$\frac{H_s}{H_p}=K\frac{R^3 d^3}{h^6}(M+jN)$$

To compensate for the reduction of sensitivity due to the increase of $h$ previous systems have increased $d$ by mounting a transmitting coil on an aircraft and a receiving coil on a separate vehicle, e.g. another aircraft flying in formation or a drogue towed behind and below the aircraft. The two coils are thus free to move relative to one another and the mutual impedance constantly changes as the two aircraft or the aircraft and drogue pitch, roll and yaw in flight.

It is an object of the present invention to provide aerial geophysical survey apparatus for measuring distortion of an electromagnetic field, caused by ores, or other conductive geological formation, and comprising a transmitting coil and a receiving coil capable of being mounted on a single airframe or other rigid or approximately rigid structure adapted for airborne operation. In such aerial survey apparatus the coils are preferably mounted as far apart as possible, for example one at each wing tip of an airframe.

This latter arrangement preferably requires an aircraft having a long wing-span constructed as rigidly as possible. The two coils may be mounted, say horizontally, at each wing-tip and the mutual or transfer impedance may be measured and continuously recorded. Such a system of horizontal coils would give the best response to a horizontal or tabular ore body. It would obviously be possible to have in addition vertical co-planar coils and vertical co-axial coils and each coil system, operating at a somewhat different frequency, would be most sensitive to slab-like ore bodies lying in a plane parallel to the plane of the coils. However, the sensitivity to a spherical ore body of the second and third systems mentioned is only ¼ and ⅛ times respectively that of the system with the horizontal coils. Having sacrificed response (by reducing distance $d$) for the advantage of a nearly rigid system, apparatus must be provided that will resolve very small changes due to ore bodies and distinguish them from spurious responses due to magnetic noise, thermal and other drifting effects in the apparatus itself, very small movements of the coils relative to each other and very small movements of the coils relative to the airframe.

Accordingly, the present invention provides aerial geophysical survey apparatus for measuring distortion of an electromagnetic field, caused by ores, or other conductive geological formations comprising in combination a transmitting coil, generator means for supplying a low frequency current to said coil for generating said field, a receiving coil, reference means for deriving from said transmitting coil a reference voltage of the same frequency as the current in said transmitting coil, an adjustable phase-shifting attenuator the input of which is connected to said reference means, an amplifier to the input of which is supplied the difference between the outputs of said receiving coil and attenuator, band-pass filter means for filtering the input of the amplifier, means for adjusting said phase-shifting attenuator whereby in the absence of said geological formations the output of said amplifier is zero or substantially zero, phase-sensitive detector means for detecting the output of said amplifier which detector means are also supplied with two phase reference voltage components derived from said reference voltage, one of said two components being substantially in phase with said reference voltage and the other component being substantially in quadrature with said reference voltage whereby the output of said phase-sensitive detector means is substantially a measure of the in-phase and quadrature voltage components of the voltage obtained at the output of said amplifier.

Interference from magnetic noise may be overcome by making the field of the transmitting coil large enough and by reducing the band width of the receiver by said filter means and/or by further filter means following said phase-sensitive detector means so that it is only of the order of 1 c./s.

Thermal and other drifting effects in the apparatus itself may be compensated by automatic means responsive to relatively slow variations in the in-phase and quadrature voltages derived from the phase-sensitive detector means and which automatic means adjust the phase-shifting attenuator to compensate for such drifting effects.

In apparatus in accordance with the present invention if the coils are mounted as rigidly as possible and as far away from the airframe as possible the effects of movements of the coils relative to the airframe may be made small. These are troublesome chiefly because of variable eddy-current coupling of the coils through the material of the airframe (particularly in the case of a metal wing) and the vicinity of movable control surfaces such as ailerons, and good results may be obtained by mounting the coils outboard of the wing tips.

There remains the effect of natural flexing of the main plane in gusty conditions, and methods of compensating for such effect are described in U.S. patent application Serial No. 601,973. An alternative procedure is to fit strain-gauges to an appropriate member of the airframe or to use a suitable accelerometer and to record the strain or acceleration alongside the response of the survey equipment. Responses of the latter which coincide with strain or acceleration responses would then be ignored.

In survey apparatus according to the invention the band-pass filter means for filtering the input to the amplifier may comprise two band-pass filters, one being connected between the reference means and the adjustable phase-shifting attenuator and the other connected between the receiving coil and the amplifier. This arrangement has the disadvantage that a special construction of filters may be necessary since it is essential to ensure that the two band-pass filters have substantially identical characteristics under their respective operating conditions, it being remembered that the filter between the attenuator and the reference means operates at a higher voltage level than the filter connected to the receiving coil. Consequently, therefore, instead of employing two filters the input to the amplifier is preferably filtered by means of a single band-pass filter to the input of which is applied the difference in the output voltages of the receiving coil and the phase-shifting attenuator. As will be referred to hereinafter, the difference in operating levels in the case of two filters may give rise to phase errors.

Embodiments of the apparatus according to the invention will now be described.

FIGURE 1 is a block schematic diagram of one embodiment of the invention and shows one transmitting coil and receiving coil, for example horizontal co-planar coils, and the associated circuitry. Any other channel of the system employing other coil arrangements and operating at other frequencies would be the same as that shown in this figure.

A source of alternating power G at a frequency, e.g. 200–300 cycles, carefully chosen to avoid known interference fields and low enough to prevent spurious responses from the overburden is applied to the transmitting coil T which may be tuned by a capacitor C to increase the energy of the field. This coil is mounted at one wing tip of an airframe. A secondary loop S, tightly coupled to the transmitting coil, is connected via a variable attenuator V to the circuit of the receiving coil O (which coil is arranged at the other wing tip and may also be tuned by a capacitor) where the two voltages are subtracted, i.e. the reference voltage applied to said circuit through the attenuator and the resultant of the potentials induced in the receiving coil. The received voltage and the reference voltage are filtered by means of identical band-pass filters F, F'. The attenuator has a phase-shift control so that complete cancellation can occur in the steady state. Any residual output due to a disturbance is amplified in an amplifier A1 and applied to a receiver system comprising two phase-sensitive detectors PSD1 and PSD2. One of these (PSD1) is supplied with a phase reference voltage direct from the secondary on the transmitting coil. It converts the in-phase signal into an output having a D.C. component. This output is filtered by a D.C. pass filter F2, amplified at A3, and used to operate a servo motor M1 or other automatic control system which in turn regulates the resistive elements in the attenuator so that the in-phase components are cancelled in the receiver circuit.

Similarly the other phase-sensitive detector PSD2 is supplied from a 90° phase-shift network PS with a phase reference voltage in quadrature to the E.M.F. in the transmitting coil secondary. The output is filtered by a D.C. pass filter F3, amplified by amplifier A4 and employed to drive a second servo motor M2 so as to adjust reactive elements of the attenuator so that the quadrature components may be cancelled.

The output of the in-phase detector PSD1 is connected through a filter F1 and an A.C. coupled amplifier A2 to a recorder P. Very slow changes will not get through the A.C. coupling to the recorder and will be cancelled by the automatic control system as they arise. The time constants of the control systems are relatively long so that responses due to ore bodies or other conductive geological formations are recorded before they are suppressed. Rapid changes will be suppressed by the phase-sensitive detectors and filters. Changes of the order of 1 second duration such as those due to flying over an ore body will be recorded. In ideal conditions the second phase-control circuit may not be necessary but in practice it allows for small phase errors in the system and obviates the risk of unwanted out-of-phase signals overloading the pre-amplifier A1. If desired, the quadrature signal at the output of detector PSD2 may be recorded in a similar manner. This has the advantage that by comparison between the two recorded signals spurious responses or responses from uninteresting geological formations, e.g. water, may be determined. This is possible because low conductivity material gives a large quadrature response compared with higher-conductivity material other things being equal.

FIGURE 2 is a block schematic diagram of another embodiment of the system according to the present invention and shows one channel thereof.

The transmitter energises the resonant transmitting coil T at a low audio frequency. This coil is mounted at one wing tip of an airframe. It has a small secondary winding S which provides a reference voltage. At the other wing tip there is a receiving coil 0 (which may be tuned) in a position of maximum coupling. The received voltage is amplified by pre-amplifier E and conveyed to the detector. In the detector the reference voltage is attenuated by an input pad B both the reference voltage and the received voltage are filtered by identical band-pass filters F, F'. The reference voltage is then passed through a phase-shifting attenuator PSA provided with both manual and automatic controls. When properly adjusted the output is identical in magnitude and phase with the received voltage. The two voltages are then subtracted. Any subsequent disturbance of the balance between the two voltages results in a signal being applied to the signal amplifier A1. The output of this amplifier is resolved into in-phase and quadrature components in the phase-sensitive detector which is supplied with phase reference currents derived from the reference winding. The two outputs, one the in-phase component and the other the quadrature component of the signal input to the detector, which in steady out-of-balance conditions are direct currents, are each used to operate a pair of amplifiers. One of each pair of amplifiers, A2 and A5, which are A.C. coupled, have long time constant integrating circuits I2 and I5 and their outputs, after limiting, at L1 and L2 are used to operate pen recorders P1 and P2. These instruments will record transient responses, one in the in-phase received voltage and the other in the quadrature received voltage. The other amplifier of each pair, namely A3 and A4, are directly coupled through integrating circuits I3 and I4 and are used to operate marginal relays which control motor M1 and M2. The motors M1 and M2 operate the resistive and capacitive (R3 and C) variable elements respectively, in the phase shifting attenuator PSA. The motors move the variable elements towards a voltage balance. In this way long term changes are automatically compensated while responses having the chosen time characteristic will be recorded.

By this method a continuous record of the in-phase and quadrature disturbances may be obtained while flying an aerial survey. The locating of the anomalies may be plotted with reference to aerial photographs and may be investigated later by ground parties.

A more detailed description of the circuit shown in FIGURE 2 will now be given.

A pair of identical band-pass filters are used for discriminating against unwanted frequencies in both the receive and reference voltages. These may be located at FF' if it is assumed that their phase characteristics are in close enough agreement for relative phase shift with small changes of frequency to be negligible. Then each filter is approximately matched to a source impedance of 1000Ω and a load impedance of 10,000Ω. The receive filter F is fed from the pre-amplifier which has an output impedance of about 1000Ω, and the reference filter F' has the input pad B which attenuates the reference voltage and presents a 1000Ω source to the filter.

Resistor R1 is 10,000Ω and R2 is about 1000Ω thus the voltage ratio due to these resistors alone is 10:0.91. R2 is shunted by a number of series resistance combinations such as R3+R4.

The first of these is the motor driven rheostat R3 and its series resistor. The rheostat is a 10-turn helical wire-wound element with a maximum resistance of 20,000Ω. The series resistance is 100,000Ω. Thus at the extreme ends of the travel of the rheostat, the resistance shunting R2 is 100,000Ω or 120,000Ω. Therefore the parallel combination varies from 990Ω to 991.7Ω i.e. a change of about 1700 parts per million. This is driven by motor M1 which is operated by relays in the relay amplifier circuit.

The motor will be operated, in one direction or the other, after the in-phase signal reaches a value of 300 parts per million. The direction of rotation of the rheostat shaft is indicated by one of two lamps. The need for over-ride switches is obviated by placing a friction clutch between the motor and the rheostat so that it slips when the rheostat reaches the end of its travel. The position of the rheostat wiper is indicated by bringing the shaft out to a knob on the front panel. This enables the rheostat to be adjusted manually irrespective of the action of the control motor.

In parallel with the auto-control are two manual controls. The first is a fine adjustment of about 4000 parts per million maximum and the other is a coarse adjustment of about 100,000 parts per million.

Fixed calibration shunts are also provided and these may be switched into circuit to calibrate the recorder.

For quadrature adjustment there are capacitors in the position of C, i.e. across R1. The first of these is a variable air capacitor with a linear law driven by motor M2, which capacitor has a maximum capacitance of 1000 pF and a rotation of 180°. The motor shaft is geared to the capacitor shaft and there are indicator lamps, a friction clutch and a manual over-ride control. In addition to the variable air capacitor there are other fixed capacitors enabling C to be adjusted in steps of 500 pF up to 10,000 pF.

The first stage of the signal amplifier A1 employs a low noise pentode and has an input potentiometer for controlling the gain. The second stage is also a pentode and is embraced by a feed-back loop. The third is a phase-splitter feeding the last stage which is a push-pull double triode having in its anode circuit the primary of the demodulator transformer.

There are, in addition to the feedback winding, two sets of secondaries on the transformer. One set is fed, at its centre taps, with a phase reference current in phase with the reference voltage and the other with a quadrature current. Thus there are, under steady out-of-balance conditions, two D.C. outputs, one a measure of the in-phase component and the other a measure of the quadrature component of the input.

Each output is taken to a centre-zero meter N1, N2 having a time constant e.g. of about 0.7 second. These meters will monitor the outputs of the two de-modulators included in the detector and provide indications when manual balancing is being carried out.

The in-phase and quadrature reference supplies take their input from the output of the reference band-pass filter and are amplified by amplifiers A6 and A7, respectively, before being supplied to the detector PSD. The in-phase amplifier A6 has a double triode which drives a push-pull pentode output stage. This provides a square wave for the de-modulators. The large voltage is required so that the reference supply does not lose control of the de-modulator when an overload occurs. The square wave is provided so that the demodulator rectifiers are switched in the shortest possible time. This, together with the low phase-shift in the signal amplifier A1 is intended to ensure that under the worst overload conditions, in-phase signals will not produce sufficient quadrature outputs to actuate the automatic quadrature controls, and vice-versa.

The quadrature phase reference supply is similar except that it is preceded by a stage PS giving a 90° phase shift.

The phase-sensitive detector outputs are D.C. coupled to their respective relay amplifiers A3 and A4 through identical R.C. networks I3 and I4 giving a time constant, e.g. of 20 seconds. Each amplifier consists of a balanced double triode having a marginal relay in each anode circuit. Under no-signal conditions both anode currents have equal datum values. When a signal arrives one anode current increases and the other decreases. At a signal corresponding to 300 parts per million one current reaches a value at which the appropriate relay operates. This applies direct current to the motor which will drive its control element in such a direction as to regain balance. It will continue to do this, under steady state conditions, until the anode current reaches the aforesaid datum value. This corresponds to the release current of the relays so further correction ceases.

The rate of correction is very slow so it should not affect the record produced by flying over a normal orebody. It will, however, prevent slow drifts from gradually producing overload conditions.

The phase-sensitive detector outputs are also taken, through R.C. networks I2 and I5, to balanced cathode-follower stages which supply outputs for operating the pen recorders. Both amplifiers A2 and A5 are A.C. coupled thus preventing any steady out-of-balance current from appearing on the record.

The R-C networks I2 and I5 may be switched to have any one of the following integrating times given by way of example: 0.5, 1, 2, 4 and 8 seconds. This facility gives a wide choice to the operator who will be able to select the optimum integrating time for the conditions prevailing.

Both outputs are limited by limiters L1 and L2 comprising rectifiers connected in parallel opposition. These limiters provide the recorders with roughly logarithmetic scales cramped at the top end. For quantative interpretation of the scale a series of calibration steps would be drawn before a survey run. Provided the gain of the signal amplifier A1 was not altered this calibration should hold for the whole of the survey.

In describing the operation of the band-pass filters it has been assumed hitherto that relative phase shifts could be held within such limits as to be negligible, so that the positions FF' (FIGURE 2) were appropriate for the relative phase of the outputs of these filters to be substantially independent of small changes of frequency. This is essential because the equipment may be sensitive to phase changes of the order of 0.0001 radian.

In practice, however, the equipment may be very sensitive to frequency and also sensitive to level, i.e. current in the transmitting coil. This is due mainly to F' operating at several times, for example 10 times, the voltage of F. If both are trimmed at low level F' may suffer slight detuning at an elevated level and this detuning will be dependent on the level. Thus there may be a chronic phase-shift due to level and also (because the phase-shift characteristics of the filters may not be truly identical) due to frequency.

To overcome this difficulty, filter F is preferably placed in position $F_1$ and filter F' is placed in position $F'_1$. Now $F_1$ receives only the difference voltage and any phase-shift within it cannot upset the balance because this occurs before the filter. Phase-shift in $F_1$ can however give trouble as follows: if the resultant signal is say in-phase with the reference coil voltage and it suffers a phase change in the filter then there will be a quadrature component in the output of the filter and this would give a false output to the quadrature recorder and the quadrature motor which would try to correct for what is not really there. However, if filter $F'_1$ has roughly the same phase-shift characteristic then this trouble will not arise since the phase reference supply is also shifted by approximately the same amount. This approximation is good enough for this purpose whereas it may not be good enough as originally arranged.

A further advantage of this arrangement is that whereas the pre-amplifier E was originally loaded by the impedance of the filter it is now loaded with a filter in series with the output of the phase-shifting attenuator V. This (at balance) means that the current flowing into the filter is zero i.e. the impedance looking out of the cathode of the cathode-follower output stage of the pre-amplifier is infinite. This makes the output voltage of the said cathode-follower independent of its mutual conductance i.e. independent of supply variation.

The filter $F_1$ is fed from the pre-amplifier and phase-shifting attenuator in series, the combined output impedance of which is about 1200Ω.

There are three main methods of arranging the coils. A preferred apparatus employs horizontal co-planar coils (channel A) and vertical co-planar coils (channel B).

The presence of the metal frame will, of course, produce a very large secondary field. This effect of the airframe is balanced out during installation.

The frequency employed should not be much higher than 300 c./s. if spurious over-burden responses are to be prevented from making the responses due to ore bodies, although further discrimination can be made by comparison between the two records obtained as already mentioned.

The next consideration in deciding the frequencies is the avoidance of harmonics of the electric power frequencies. If both British 50 c./s. and North American 60 c./s. mains are considered it can be shown that the best frequencies are 214 c./s., 270 c./s. and 320 c./s. From weight considerations it is desirable to install only two coil systems, so from the above discussion of the relative merits of the three coil arrangements it is preferred to operate channel A at 214 c./s. using horizontal co-planar coils and channel B at 320 c./s. using vertical co-planar coils.

Iron-cored solenoids may be used instead of slightly larger air-cored coils or loops. This is desirable inter alia owing to mechanical considerations such as comparative ease of mounting a self-supporting rod assembly and ease of streamlining.

In the transmitting coil the core is of high-grade grain-oriented silicon steel strip of thickness 0.004" and length 4' bonded into a rod having an iron cross-sectional area of 4 square inches and total cross-sectional area, including the synthetic resin bonding material, of 2" x 2½". Because the centre of the rod is occupied by mounting attachments, only the outer portions are available for winding. Placing the windings towards the ends of the rods increases the magnetic moment so this arrangement is very suitable.

The receiving coils may employ iron cores substantially identical mechanically with those used for the transmitting rods but composed of a suitable nickel-iron alloy, for example an alloy comprising 50% iron and 50% nickel. Thus each wing tip is equipped with a cruciform of approximately the same size and weight. It is possible to tune the receiving coils to obtain greater sensitivity and some discrimination against unwanted frequencies. However, there is a possibility of phase changes resulting from drift in the tuning of the coils or from frequency drift.

Voltages induced in the receiving coils are conveyed to the detector via wing-tip pre-amplifiers of the cathode follower type.

If the system includes compensation means in accordance with U.S. patent application Serial No. 601,973 and is applied to a strutted-wing aircraft, the receiving and transmitting cruciforms may, as shown in FIGURE 3, be suspended from wing-tip extensions. These extensions 10, which may be about 2 feet long, are preferably constructed in fibre-glass laminate or other non-metallic material. At the extreme end of the extension two vertical glass laminate tubes 11 of adjustable length are installed in fore and aft positions. To the bottom of these is attached the horizontal rod 12 in the direction of flight.

The vertical rod 13 stands between the support tubes and is attached at 14 to the extension 10 at the upper end. This attachment 14 may be moved in an athwartships direction by means of a torque solenoid 15 operated from the cabin. Thus the cruciform assembly may be rocked about an axis approximately coinciding with the horizontal rod and by this means the angle between the transmitting and receiving vertical rods may be adjusted in flight.

In addition the distance from the neutral axis of the wing to the centre of the cruciform may be adjusted on the ground by extending or shortening the support tubes 11. The attachment on the vertical rod, mentioned above, is designed to allow this adjustment to be made. The need for these adjustments is dealt with in the said U.S. patent application Serial No. 601,973.

By means of fairing 16 the whole cruciform assembly can be made streamlined and faired in with the extended wing tip.

The embodiments of the invention in which an exclusive property or privilege is claimed are defined as follows:

1. Aerial geophysical survey apparatus for measuring distortion of a cyclically varying magnetic field, caused by ores or other conductive geological formations, comprising in combination: a transmitting coil, generator means for supplying a low frequency current to said coil for generating said magnetic field, a receiving coil positioned in said magnetic field, means for mounting said transmitting and receiving coils on an airframe or other substantially rigid structure so as to maintain a substantially fixed relation relative to each other at all times, means for transporting said apparatus above the earth's surface, reference means for deriving from said transmitting coil a reference voltage of the same frequency as the current in said transmitting coil, an adjustable phase-shifting attenuator the input of which is connected to said reference means, an amplifier to the input of which is supplied the difference between the outputs of said receiving coil and attenuator, band-pass filter means for filtering the input of the amplifier, means for adjusting said phase-shifting attenuator whereby in the absence of said geological formations the output of said amplifier is zero or substantially zero, phase-sensitive detector means for detecting the output of said amplifier which detector means are also supplied with two phase reference voltage components derived from said reference voltage, one of said two components being substantially in phase with said reference voltage and the other component being substantially in quadrature with said reference voltage whereby the output of said phase-sensitive detector means is substantially a measure of the in-phase and quadrature voltage components of the voltage obtained at the output of said amplifier.

2. Aerial geophysical survey apparatus for measuring distortion of a cyclically varying magnetic field, caused by ores or other conductive geological formations, comprising in combination: an airframe or other rigid or approximately rigid structure which is adapted for airborne operation, a transmitting coil secured to said structure, generator means for supplying a low frequency current to said coil for generating said field, a receiving coil secured to said structure and spaced from said transmitting coil, reference means for deriving from said transmitting coil a reference voltage of the same frequency as the current in said transmitting coil, an adjustable phase-shifting attenuator the input of which is connected to said reference means, an amplifier to the input of which is supplied the difference between the outputs of said receiving coil and attenuator, band-pass filter means for filtering the input of the amplifier, means for adjusting said phase-shifting attenuator whereby in the absence of said geological formations the output of said amplifier is zero or subsantially zero, phase-sensitive detector means for detecting the output of said amplifier which detector means are also supplied with two phase reference voltage components derived from said reference voltage, one of said two components being substantially in phase with said reference voltage and the other component being substantially in quadrature with said reference voltage whereby the output of said phase-sensitive detector means is substantially a measure of the in-phase and quadrature voltage components of the voltage obtained at the output of said amplifier.

3. Aerial geophysical survey apparatus for measuring distortion of a cyclically varying magnetic field, caused by ores or other conductive geological formations, comprising in combination: an airframe or other rigid or approximately rigid structure which is adapted for airborne operation, a transmitting coil secured to said structure, generator means for supplying a low frequency current to said coil for generating said magnetic field, a receiving coil secured to said structure and spaced from said transmitting coil, reference means for deriving from said transmitting coil a reference voltage of the same frequency as the current in said transmitting coil, an adjustable phase-shifting attenuator of which the input is connected to said reference means, a first band-pass filter to which is supplied the difference in the outputs of said receiving coil and said phase-shifting attenuator, an amplifier for amplifying the output of said first band-pass filter, means for adjusting said phase-shifting attenuator whereby in the absence of said geological formations the output of said amplifier is zero or substantially zero, phase-sensitive detector means for detecting the output of said amplifier which detector means are also supplied with two phase reference voltage components derived from the output of a second band-pass filter having characteristics substantially identical with those of said first band-pass filter, the input of which second filter is connected to said reference means, one of said two components being in phase with said reference voltage and the other component being in quadrature with said reference voltage whereby the output of said phase-sensitive detector means is substantially a measure of the in-phase and quadrature voltage components of the voltage obtained at the output of said amplifier.

4. Aerial geophysical survey apparatus as claimed in claim 1, including automatic control means responsive to variations in said in-phase and quadrature voltage components which are slow relative to the expected period of variation in these voltages which may be caused by said geological formations at the desired speed of flight, which automatic control means are adapted to adjust said phase-shifting attenuator in such manner that the first-mentioned variations are reduced.

5. Aerial geophysical survey apparatus as claimed in claim 2, including automatic control means responsive to variations in said in-phase and quadrature voltage components which are slow relative to the expected period of variation in these voltages which may be caused by said geological formations at the desired speed of flight, which automatic control means are adapted to adjust said phase-shifting attenuator in such manner that the first-mentioned variations are reduced.

6. Aerial geophysical survey apparatus as claimed in claim 3, including automatic control means responsive to variations in said in-phase and quadrature voltage components which are slow relative to the expected period of variation in these voltages which may be caused by said geological formations at the desired speed of flight, which automatic control means are adapted to adjust said phase-shifting attenuator in such manner that the first-mentioned variations are reduced.

7. Aerial geophysical survey apparatus as claimed in claim 1, including recording means for recording those variations in said in-phase and quadrature voltage components which have periods approximately equal to the expected period of variation in these voltages which may be caused by said geological formations at the desired speed of flight.

8. Aerial geophysical survey apparatus as claimed in claim 2, including recording means for recording those variations in said in-phase and quadrature voltage components which have periods approximately equal to the expected period of variation in these voltages which may be caused by said geological formations at the desired speed of flight.

9. Aerial geophysical survey apparatus as claimed in claim 3, including recording means for recording those variations in said in-phase and quadrature voltage components which have periods approximately equal to the expected period of variation in these voltages which may be caused by said geological formations at the desired speed of flight.

10. Aerial geophysical survey apparatus as claimed in claim 4, including recording means for recording those variations in said in-phase and quadrature voltage components which have periods approximately equal to the expected period of variation in these voltages which may be caused by said geological formations at the desired speed of flight.

11. Aerial geophysical survey apparatus as claimed in claim 5, including recording means for recording those variations in said in-phase and quadrature voltage components which have periods approximately equal to the expected period of variation in these voltages which may be caused by said geological formations at the desired speed of flight.

12. Aerial geophysical survey apparatus as claimed in claim 6, including recording means for recording those variations in said in-phase and quadrature voltage components which have periods approximately equal to the expected period of variation in these voltages which may be caused by said geological formations at the desired speed of flight.

13. Aerial geophysical survey apparatus as claimed in claim 1, in which the transmitting coil and the receiving coil are either or both in the form of coils having magnetic cores.

14. Aerial geophysical survey apparatus as claimed in claim 13, in which the coils having magnetic cores are secured below and spaced from the wingtips of an airframe.

15. Aerial geophysical survey apparatus comprising apparatus as claimed in claim 1 for measuring distortion of a first electromagnetic field generated by a first low frequency current in a first transmitting coil, and also comprising apparatus in accordance with claim 1 for measuring distortion of a second electromagnetic field generated by a second low frequency current in a second transmitting coil, said second low frequency current differing in frequency from said first low frequency current, said first and second transmitting coils being orthogonal and the corresponding receiving coils also being orthogonal.

References Cited in the file of this patent

UNITED STATES PATENTS

| | | |
|---|---|---|
| 2,169,685 | Evjen | Aug. 15, 1939 |
| 2,366,621 | Hineline | Jan. 2, 1945 |
| 2,455,792 | Meunier | Dec. 7, 1948 |
| 2,489,920 | Michel | Nov. 29, 1949 |
| 2,788,483 | Doll | Apr. 9, 1957 |

FOREIGN PATENTS

| | | |
|---|---|---|
| 510,909 | Canada | Mar. 15, 1955 |